United States Patent [19]

Dai et al.

[11] Patent Number: 4,604,450

[45] Date of Patent: Aug. 5, 1986

[54] POLYMER FROM AZETIDINE-2,4-DIONE AND POLYOL OR POLYAMINE

[75] Inventors: Shenghong A. Dai, Wallingford; Steven J. Grossman, Cheshire; Kemal Onder, North Haven, all of Conn.

[73] Assignee: The Dow Chemical Company, Midland, Mich.

[21] Appl. No.: 766,221

[22] Filed: Aug. 16, 1985

Related U.S. Application Data

[62] Division of Ser. No. 608,004, May 7, 1984, Pat. No. 4,550,157.

[51] Int. Cl.$^4$ .............................................. C08G 69/00
[52] U.S. Cl. ...................................... 528/322; 525/50; 525/437; 525/540; 528/170; 528/220; 528/229; 528/321
[58] Field of Search ............... 528/322, 321, 170, 220, 528/229; 525/50, 437, 540

[56] References Cited

U.S. PATENT DOCUMENTS

| | | | |
|---|---|---|---|
| 2,594,145 | 4/1952 | Flory | 528/322 |
| 3,862,262 | 1/1975 | Hendrick et al. | 260/857 |
| 4,031,164 | 6/1977 | Hedrick et al. | 260/857 |
| 4,034,015 | 7/1977 | Hedrick et al. | 260/857 |

*Primary Examiner*—Harold D. Anderson
*Attorney, Agent, or Firm*—James S. Rose

[57] ABSTRACT

Novel polyamide block copolymers are provided which comprise a central block of a soft segment derived from the residue of a polymeric polyol or polyamine joined to terminal hard segment polyamide blocks. The linkages which join the blocks are of a novel type and are the opened form of certain bis azetidine-2,4-dione rings.

The block copolymers can be prepared very rapidly via anionically polymerizing lactams on to prepolymer soft segments containing terminal azetidine-2,4-dione rings.

The speed with which the polymerizations can be carried out make the block copolymers particularly useful for the RIM preparation of molded parts.

16 Claims, No Drawings

POLYMER FROM AZETIDINE-2,4-DIONE AND POLYOL OR POLYAMINE

This is a divisional of application Ser. No. 608,004, filed May 7, 1984, now U.S. Pat. No. 4,550,157.

BACKGROUND OF THE INVENTION

1. Field of the Invention

This invention relates to the preparation of polyamides and is more particularly concerned with the preparation of polyamide block copolymers and certain azetidine-2,4-dione prepolymer intermediates therefor.

2. Description of the Prior Art

The rapid anionic polymerization of lactams in general, and, caprolactam in particular, to polyamide or polylactam polymers has long been known and practiced in the art. Further, it is known that the copolymerization of lactams in the presence of polyols provides very fast polymerizing systems suitable for the preparation of RIM (reaction injection molded) parts (see U.S. Pat. Nos. 3,862,262; 4,031,164 and 4,034,015).

In the patents cited supra the lactam monomer and polyol are polymerized in the presence of a lactam polymerization catalyst and either acyl polylactam or polyacyl lactam with the latter two reactants serving as the units which couple the recurring amide and polyol residues in the polymer chains. In an optional embodiment, the polyols and acyl polylactam or polyacyl lactams can be prereacted prior to the lactam polymerization.

We have now discovered what we believe to be a new class of polyamide block copolymers wherein residues of polymeric polyols or polymeric polyamines serve as the central soft segment block for the copolymer with the polyamide blocks attached to terminal positions of the soft segment. The polyamide blocks are attached to the soft segments through linkages which are entirely different from the residues arising from the acyl polylactams and polyacyl lactams of the prior art. The linkages in the present copolymers provide sites which can be substituted by a variety of groups thereby serving as a means for modifying the polymer properties.

SUMMARY OF THE INVENTION

This invention comprises polyamide block copolymers having the formula (I)

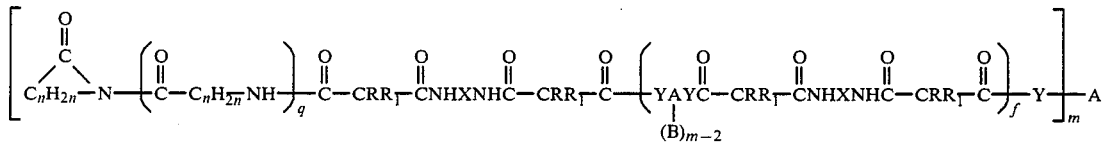

wherein A is the residue of a polymeric polyol or polyamine having a molecular weight of from about 400 to about 8000 and a functionality m of from about 2 to about 6, Y represents —O— when said A is the residue of a polymeric polyol and —NH— when said A is the residue of a polymeric polyamine, f has an average value between 0 and 1, B represents a branch unit when the functionality of said polymeric polyol or polyamine is greater than 2, R and $R_1$ when taken separately are independently selected from the group consisting of hydrogen and hydrocarbyl, and when R and $R_1$ are taken together with the carbon atom to which they are joined represent a cycloalkane having 4 to 8 ring carbon atoms, inclusive, X is selected from the group consisting of lower-alkylene, cycloalkylene, arylene, and divalent radicals having the formula

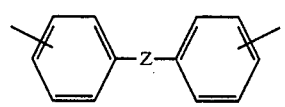

wherein Z is selected from the group consisting of —CO—, —O—, —SO$_2$—, and alkylene having 1 to 4 carbon atoms, inclusive, $C_nH_{2n}$ represents an alkylene radical of 3 to 12 carbon atoms, inclusive, present in a polyamide recurring unit wherein q has a mean value of at least about 2 and the weight percent proportion of said polyamide block is from about 25 percent to about 90 percent of said copolymer.

The invention also comprises azetidine-2,4-dione prepolymers having the formula (II)

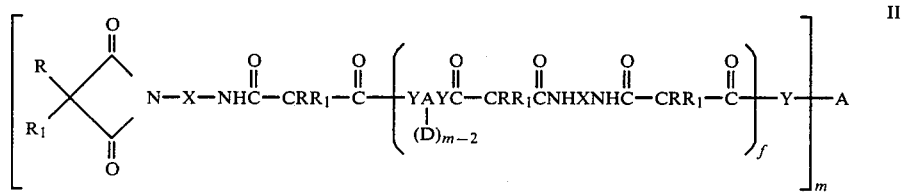

wherein A, m, Y, f, R, $R_1$ and X are as defined above and D represents a branch unit when the functionality of said polymeric polyol or polyamine is greater than 2.

The invention also comprises a process for the preparation of the polyamide block copolymers (I) by polymerizing in the presence of an anionic polymerization catalyst, a lactam having the formula (III)

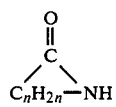

wherein $C_nH_{2n}$ is defined as above and the azetidine-2,4-dione prepolymer (II) defined above wherein said lactam is employed in a range of from about 25 to about 90 percent by weight of the combined weights of (II) and (III).

The invention also comprises a process for the preparation of the azetidine-2,4-dione prepolymers (II) by reacting a bis azetidine-2,4-dione having the formula (IV)

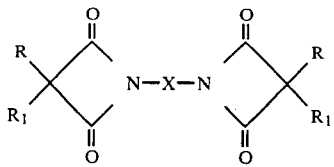

wherein R, R$_1$ and X are defined as above with a polyol or polyamine having the formula (V)

  V wherein A, Y and m are defined above and wherein the number of moles of (IV) employed per mole of (V) is substantially equivalent to the value of m in said (V).

The term "branch unit" in respect of B and D means units having the respective formulae

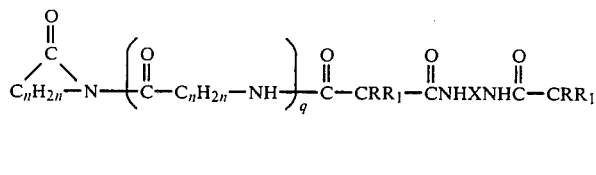 , and 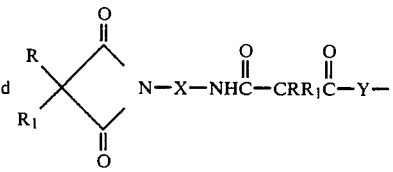

wherein Y, R, R$_1$, X, q, and CnH$_{2n}$ have the same significance as above. In (I) and (II) when m=2 then there are no branch units and the B and D terms disappear from the formulae. In either case, when m is greater than 2 but the value of f is 0, then these also have no branch units. However, the polymers are generally obtained as statistical mixtures with f having the average values between 0 and 1 and thus both (I) and (II) would be branched when m exceeds 2.

The term "hydrocarbyl" means the monovalent radical obtained by removing one hydrogen atom from the parent hydrocarbon having from 1 to 18 carbon atoms. Illustrative of hydrocarbyl are alkyl such as methyl, ethyl, propyl, butyl, pentyl, hexyl, octyl, decyl, dodecyl, hexadecyl, octadecyl, and the like, including isomeric forms thereof; alkenyl such as vinyl, allyl, butenyl, pentenyl, hexenyl, octenyl, decenyl, undecenyl, tridecenyl, hexadecenyl, octadecenyl, and the like, including isomeric forms thereof; aralkyl such as benzyl, phenethyl, phenylpropyl, benzhydryl, naphthylmethyl, and the like; aryl such as phenyl, tolyl, xylyl, naphthyl, biphenylyl, and the like; cycloalkyl such as cyclobutyl, cyclopentyl, cyclohexyl, cycloheptyl, cyclooctyl and the like, including isomeric forms thereof; and cycloalkenyl such as cyclopentenyl, cyclohexenyl, cycloheptenyl, cyclooctenyl, and the like, including isomeric forms thereof.

The hydrocarbyl groups which form the groups R and R$_1$ can be substituted by one or a plurality of inert substituents. The term "inert substituent" means a substituent which is inert under the conditions of the polymerization process and does not otherwise interfere with said process or the resulting copolymer or the azetidine-2,4-dione prepolymer. Illustrative of such substituents are halo, i.e. chloro, bromo, fluoro and iodo; nitro; alkoxy from 1 to 8 carbon atoms, inclusive, such as methoxy, ethoxy, propoxy, butoxy, pentyloxy, hexyloxy, heptyloxy, octyloxy and the like, including isomeric forms thereof; alkylmercapto from 1 to 8 carbon atoms, inclusive, such as methylmercapto, ethylmercapto, propylmercapto, butylmercapto, pentylmercapto, hexylmercapto, heptylmercapto, octylmercapto, and the like, including isomeric forms thereof; and cyano.

Illustrative of the term "cycloalkane having 4 to 8 ring carbon atoms" are cyclobutane, 3-methylcyclobutane, cyclopentane, 3-methylcyclopentane, cyclohexane, 3-methylcyclohexane, 4-methylcyclohexane, cycloheptane, 4-methylcycloheptane, cyclooctane, 5-methylcyclooctane, and the like.

The term "lower-alkylene" means straight and branched chain alkylene having 1 to 8 carbon atoms, inclusive, such as methylene, ethylene, propylene, butylene, pentylene, hexylene, heptylene, octylene, and isomeric forms thereof.

The term "cycloalkylene" means cycloalkylene having 5 to 6 ring carbon atoms, inclusive, such as 1,3-cyclopentylene, 1,3-cyclohexylene, 1,4-cyclohexylene, 2-methyl-1,4-cyclohexylene, and the like.

The term "arylene" means arylene having 6 to 18 carbon atoms, inclusive, such as phenylene, tolylene, naphthylene, diphenylylene, and the like.

Illustrative of the alkylene radical —CnH$_{2n}$— having 3 to 12 carbon atoms, inclusive, are 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 2-methyl-1,5-pentylene, 2-ethyl-1,5pentylene, 2,3-dimethyl-1,5-pentylene, and the like.

The copolymers in accordance with the present invention can be used as molding powders, for the preparation of fibers and coatings from solution, and for injection molding, extruding, casting, and the like. More importantly, because of the very rapid polymerization of the instant polymers, they are very useful for the preparation of molded parts by the RIM method. The solid polymers so obtained can be used in bushings, seal faces, electric insulators, impellers, pistons and piston rings, gears, thread guides, cams, brake linings, clutch faces and abrasive articles, RIM prepared auto parts such as body elements, panels, doors, engine hoods, skirts, air scoops, and the like.

The azetidine-2,4-dione prepolymers (II) in accordance with the present invention find their primary utility in the preparation of the polyamide block copolymers of the present invention.

DETAILED DESCRIPTION OF THE INVENTION

The copolymers in accordance with the present invention, as noted above, are prepared by anionically polymerizing the appropriate lactam (III) on to the terminal azetidine-2,4-dione groups of the novel azetidine-2,4-dione prepolymers (II).

Accordingly, the copolymers contain a number of polyamide blocks arising from the lactam polymerization which blocks can be regarded as hard segments. The number of these hard segments is from 2 to 6 depending on the value of m in formula (I). The number of recurring amide units in any segment is governed by the value of q.

Because of the hard segments the present copolymers are crystalline polymers, however, their hard crystalline properties are easily modified by the presence of the soft segments arising from (II).

The azetidine-2,4-dione prepolymer which becomes incorporated as a central block in the copolymer contains the residues (A) of polymeric polyols or polyamines and can be regarded as a soft segment. Therefore, the proportion in which the prepolymers are included in the copolymers, or, conversely, the length of the hard segments, has a direct bearing on copolymer properties. Specifically, as the soft segment proportion is increased the properties of the hard polyamide segments are modified toward more resilient polymers having higher elasticity.

In connection with the relative proportions of hard to soft segments, advantageously the polyamide blocks fall within a range of from about 25 to about 90 percent by weight of the total copolymer weight. Preferably the polyamide blocks are from about 50 to about 85 percent by weight of the total.

Generally speaking, the higher the branching in the copolymers the more deleterious the effect on final polymer properties. The values of m and f in (II) and ultimately in (I) control the degree of branching as discussed above. While little control can be exercised over f, the value of m is controllable by the choice of polyol or polyamine functionality, and, as noted above, when $m=2$ there is no branching.

Accordingly, the preferable value of m is 2.

It will be recognized by one skilled in the art that the mean value for q for any given hard segment will vary considerably depending on such factors as the number of hard segments present (i.e. the value of m), the weight percent content of polyamide, and the distribution of the amide units. In this connection, the mean value of q is at least about 2, and, preferably, at least about 10.

Preferred lactams for the preparation of the copolymers (I) are those wherein $C_nH_{2n}$ represents straight chain alkylene $(CH_2)_n$ wherein $n=3$ to 12, inclusive, and, most preferably, 5 to 11, inclusive. Illustrative of the lactams are pyrrolidone, piperidone, caprolactam, 4-methylcaprolactam, 4,5-dimethylcaprolactam, 4-ethylcaprolactam, heptanolactam, octanolactam, nonanolactam, decanolactam, undecanolactam, laurolactam, and the like. Preferred of the above species are the caprolactams with caprolactam itself being the most preferred. Mixtures of two or more lactams are also contemplated in the present lactam copolymers.

The anionic polymerization of the lactam with the azetidine-2,4-dione prepolymer is readily carried out using polymerization conditions analogous to those described in the prior art; for example see U.S. Pat. No. 4,031,164 cited supra for typical reaction conditions and whose teaching is incorporated herein by reference.

The lactam and prepolymer are advantageously heated in the absence of air and moisture at a temperature within a range of from about 80° C. to about 250° C. until the polymerization of the lactam is completed. Preferably, the temperature range is from about 90° C. to about 175° C.

While any of the known anionic lactam polymerization catalysts can be employed such as the ones disclosed in U.S. Pat. No. 4,031,164 cited supra, a preferred group comprises the Grignard type reagents such as methyl magnesium bromide, ethyl magnesium bromide, and the like.

The optimum proportion of catalyst employed for any given polymerization is easily determined by trial and error methods. Generally speaking, the catalyst is employed in a range of from about 0.1 mole percent to about 10 mole percent based on lactam.

The azetidine-2,4-dione groups on the ends of the prepolymer (II) act as promoters by activating the anionically catalyzed ring opening polymerization of lactams. Also, the azetidinedione ring is opened in the course of the polymerization and acts as the linkage between the polyamide segments and the soft segment.

Because of the rapid promotion of the lactam polymerization process by these terminal azetidinedione groups, the present copolymers are particularly adaptable to preparation via RIM methods. In this regard, see U.S. Pat. No. 4,342,841 and references cited therein for typical methods for the preparation of polyamides by RIM procedures which teaching is incorporated herein by reference.

The novel prepolymers (II) in accordance with the present invention are prepared according to the process set forth above. Typically, (IV) and (V) are heated together in the proportions set forth above at a temperature of at least 125° C. and, advantageously, within a range of from about 130 to about 180° C. until all the polyol or polyamine has been consumed. Generally speaking, the azetidine ring is more easily opened by polyamines than by polyols. When the latter are being employed it is often advantageous to use a catalyst to speed up the opening of the azetidine ring. Illustrative of such catalysts are triethyl amine, tributyl amine, triethylenediamine, 1,8-diazabicyclo[5.4.0]undec-7-ene (DBU), and the like.

It will be recognized by one skilled in the art that the products obtained will consist of mixtures of low molecular weight oligomers thus the average value of f falls between 0 and 1. In the case of the slower reacting polyols the major species present in the mixture will be the one wherein f is 0. In the case of the more active amines, the average values of f will be skewed to higher fractions within the 0 to 1 range.

Optionally, solvents can be employed but are not particularly necessary in the preparation of the prepolymers. In fact, it is preferred to operate in the absence of solvent because the prepolymers can then be obtained directly without the need of any purification steps.

The prepolymers are obtained as stable tractable viscous liquids. They are characterized by viscosities falling within the range of from about 4000 cps to about 100,000 cps at 25° C.

The preferred classes of azetidine-2,4-diones (IV) for the preparation of (II) are those wherein X is arylene and divalent radicals having the formula

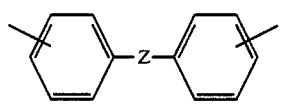

as defined above and R and $R_1$ are the same or different alkyl groups having 1 to 4 carbon atoms, inclusive.

Illustrative but not limiting of the azetidinedione compounds are 1,2-bis(3,3-dimethyl-2,4-dioxoazetidino) ethane, 1,4-bis(3,3-dimethyl-2,4-dioxoazetidino)butane, 1,6-bis(3,3-dimethyl-2,4-dioxoazetidino)hexane, 1,2-bis(3-methyl-3-benzyl-2,4-dioxoazetidino)ethane, 1,2-bis(3-methyl-3-phenyl-2,4-dioxoazetidino)ethane, 1,2-bis(3-methyl-3-cyclohexyl-2,4-dioxo-azetidino)ethane, 1,4-bis(3-methyl-3-allyl-2,4-dioxo-azetidino)butane, 1,6-bis(3-methyl-3-butyl-2,4-dioxo-azetidino)hexane, 1,6-bis(3,3-diethyl-2,4-dioxo-azetidino)hexane, and the like; 1,3-bis(3-methyl-3-phenyl-2,4-dioxo-azetidino)cyclopentane, 1,4-bis(3,3-dimethyl-2,4-dioxo-azetidino)cyclohexane, 1,4-bis(3-p-chlorobenzyl-3-phenyl-2,4-dioxoazetidino)cyclohexane, and the like; 1,4-bis(2,4-dioxoazetidino)benzene, 1,4-bis(3,3-dimethyl-2,4-dioxoazetidino)benzene, 1,4-bis(3-ethyl-3-butyl-2,4-dioxoazetidino)benzene, 1,3-bis(3-ethyl-3-butyl-2,4-dioxoazetidino)benzene, 1,3-bis(3,3-dimethyl-2,4-dioxo-azetidino)-2-methyl-and -6-methylbenzene and mixtures thereof, 1,3-bis(3-ethyl-3-butyl-2,4-dioxo-azetidino)-2-methyl- and -6-methylbenzene and mixtures thereof, 1,3-bis(3,3-dibutyl-2,4-dioxo-azetidino)-2-methyl- and -6-methylbenzene and mixtures thereof, 1,3-bis(3-methyl-3-phenyl-2,4-dioxo-azetidino)-2-methyl- and-6-methylbenzene and mixtures thereof, 1,1'-methylenebis[4-(2,4-dioxo-azetidino)benzene], 1,1'-methylenebis[4-(3,3-dimethyl-2,4-dioxo-azetidino)benzene], 1,1'-methylenebis[4-(3,3-diethyl-2,4-dioxo-azetidino)benzene], 1,1'-methylenebis[4-(3,3-dipropyl-2,4-dioxo-azetidino) benzene], 1,1'-methylenebis[4-(3,3-dibutyl-2,4-dioxoazetidino)benzene], 1,1'-methylenebis[4-(3-ethyl-3-butyl-2,4-dioxoazetidino)benzene], 1,1'-methylenebis[4-(3-methyl-3-phenyl-2,4-dioxo-azetidino)benzene], 1,1'-methylenebis[4-(3-methyl-3-benzyl-2,4-dioxoazetidino)benzene], 1,1'-methylenebis[4-(3,3-tetramethy-lene-2,4-dioxo-azetidino)benzene], 1,1'-methylenebis[4(3,3-pentamethylene-2,4-dioxo-azetidino)benzene], 1,1'-carbonylbis[4-(3,3-dimethyl-2,4-dioxo-azetidino) benzene], 1,1'-carbonylbis[4-(3-ethyl-3-butyl-2,4-dioxoazetidino)-benzene], 1,1'-oxybis[4-(3,3-dimethyl-2,4dioxoazetidino)benzene], 1,1'-oxybis[4-(3-ethyl-3-butyl-2,4-dioxo-azetidino)benzene], and the like.

Preferred amongst the species set forth above are 1,1'-methylenebis[4-(3,3-dimethyl-2,4-dioxo-azetidino) benzene], 1,1'-methylenebis[4-(3,3-diethyl-2,4-dioxoazetidino)benzene], 1,1'-methylenebis[4-(3-ethyl-3-butyl-2,4-dioxo-azetidino)benzene], and the like.

The azetidinediones are known compounds and are readily prepared using the procedures set forth in U.S. Pat. No. 3,265,684 wherein the appropriately substituted acid chlorides are reacted with the appropriate isocyanate in the presence of tertiary amines to form the azetidinediones. Using the appropriate diisocyanates and 2 molar proportions of the acid chlorides provides the diazetidinediones. The teaching of the above patent is incorporated herein by reference.

The preferred polymeric polyols and polyamines (V) for the preparation of the prepolymers fall within a molecular weight range of from about 600 to about 4000, most preferably from about 2000 to about 3000. Also, in accordance with the preferred value for m set forth above the preferred functionality of (V) is 2.

Illustrative, but not limiting, of the classes of polyols which can be used are the polyoxyalkylene polyethers; polyester polyols; polyol adducts derived from ethylene oxide with methylenedianiline and polymethylene polyphenylamine mixtures (in accordance with U.S. Pat. No. 3,499,009); polyols obtained by the Mannich condensation of a phenolic compound with formaldehyde, an alkanolamine, and ethylene oxide (in accordance with U.S. Pat. No. 3,297,597); vinyl reinforced polyether polyols, e.g. polyols obtained by the polymerization of styrene or acrylonitrile in the presence of the polyether; polyacetals prepared from glycols such as diethylene glycol and formaldehyde; polycarbonates, for example those derived from butanediol with diarylcarbonates; polyester amides, the resole polyols (see Prep. Methods of Polymer Chem. by W. R. Sorenson et al., 1961, page 293, Interscience Publishers, New York, N.Y.); and the polybutadiene resins having primary hydroxyl groups (see Poly Bd. Liquid Resins, Product Bulletin BD-3, October 1974, Arco Chemical Company, Div. of Atlantic Richfield, New York, N.Y.).

Illustrative but not limiting of the polyamines which can be used are the primary amine terminated polyether resins made from an appropriate initiator to which lower alkylene oxides such as ethylene oxide, propylene oxide, butylene oxide, or mixtures thereof are added with the resulting hydroxyl terminated polyol then being aminated. When two or more oxides are used they may be present as random mixtures or blocks of one or the other polyether. If ethylene oxide is used it is desirable to cap the hydroxyl terminated polyol with a small amount of higher alkylene oxide to ensure that the terminal hydroxyls are essentially secondary, and, thus more easily replaced by —$NH_2$ groups.

A preferred group of polyols comprises the polypropyleneoxy-polyethyleneoxy capped diols obtained by the alkoxylation of water, ethylene glycol, propylene glycol, aniline, and the like; the polyester diols obtained from the reaction of dibasic carboxylic acids such as succinic, adipic, suberic, azelaic, phthalic and isophthalic acids, and the like, with alkylene glycols and oxyalkylene glycols to form the corresponding polyalkylene, and polyoxyalkylene ester diols or copolymers thereof.

A preferred group of polyamines are the polyoxyethylene diamines having a molecular weight of from about 600 to about 2000 and polyoxypropylene diamines having a molecular weight of from about 400 to about 2000.

Further modification of copolymer properties is readily accomplished by the addition of fillers such as clay, feldspar, wollastonite, calcined kaolin, and the like; reinforcing materials such as fiber glass strands and roving, organic fibers such as poly(benzamide), graphite fibers, and the like; stabilizers, anti-oxidants, wax lubricants, plasticizers, flame retardants, colorants, and the like.

The copolymers in accordance with the present invention can be obtained in the form of very hard high modulus thermoset plastics or in the preferred form of thermoplastics enjoying all of the major benefits inherent in such materials such as moldability, ease of extrusion and injection molding, the solvent solubility characteristics of nylon type polyamides, and the like. Furthermore, the preferred thermoplastic polyamide products can be tailored from soft elastomers to tough structural plastics by varying the type and amount of prepolymers as discussed fully above.

The following examples describe the manner and process of making and using the invention and set forth the best mode contemplated by the inventors of carrying out the invention but are not to be construed as limiting.

EXAMPLE 1

A 300 ml. resin flask equipped with a mechanical stirrer, thermometer, condenser, and an argon purge inlet tube was charged with 60 g. (0.119 mole) of 1,1'methylenebis[4-(3-ethyl-3-butyl-2,4-dioxo-azetidino) benzene]and 117.1 g. (0.0597 mole) of Jeffamine D-2000 (a polyoxypropylene diamine supplied by Texaco Chemical Co., Bellaire, Texas and analyzed by amine equivalent determination to have a MW about 1961).

The reactants were heated at 145° C. for about 18 hours during constant stirring to produce a slightly turbid pale yellow colored viscous liquid. Infrared analysis of the liquid product showed the consumption of all the amino groups.

Thus there was produced an azetidine-2,4-dione prepolymer in accordance with the present invention having the formula

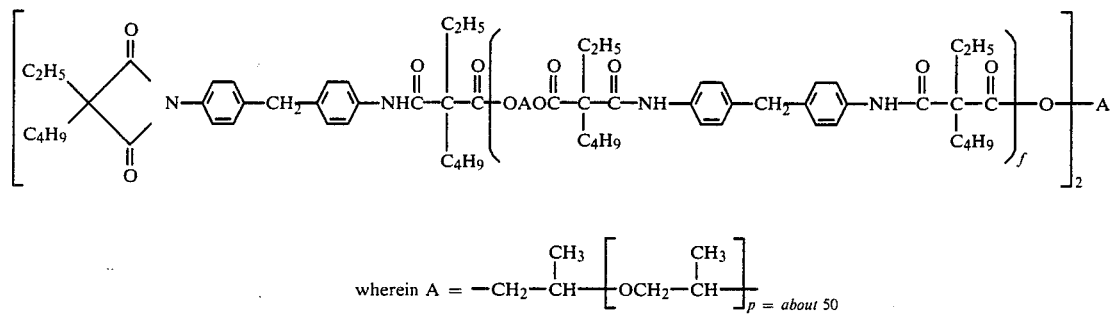

having a viscosity of 48,000 cps at 25° C. Gel permeation chromatography indicated that f had a mean value approaching about 0.5.

EXAMPLE 2

Using a similar apparatus and procedure as set forth in Example 1, 60 g. (0.119 mole) of 1,1'-methylenebis[4-o (3-ethyl-3-butyl-2,4-dioxo-azetidino)benzene], 179.1 g. (0.0597 mole) of a 3000 MW polyoxypropylene glycol, and a few drops of 1,8-diazabicyclo[5.4.0]undec-7-ene (DBU catalyst) were heated at 150° C. to about 175° C. for about 18 hours. Infrared analysis of the viscous yellow liquid product showed the consumption of all the hydroxyl groups.

Thus there was produced an azetidine-2,4-dione prepolymer in accordance with the present invention having the formula

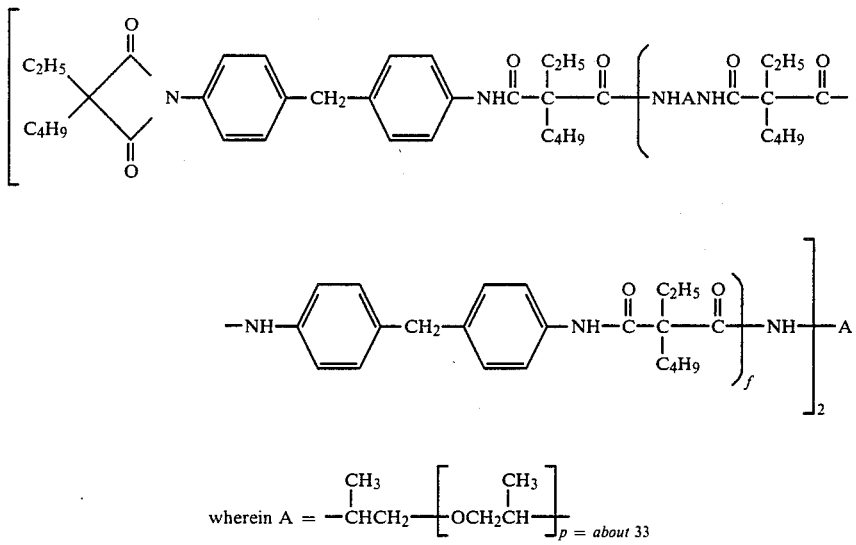

having a viscosity of 10,000 cps at 25° C. Gel permeation chromatography (GPC) was not obtained on this material, however, extrapolation of the GPC data of the prepolymer obtained in the following Example 3 having about half the viscosity would indicate an average value of f between 0 and 0.5 for the above prepolymer.

EXAMPLE 3

Using a similar apparatus and procedure as set forth in Example 1, 200 g. (0.40 mole) of 1,1'-methylenebis[4(3-ethyl-3-butyl-2,4-dioxo-azetidino)-benzene], 402.8 g. (0.20 mole) of a 2025 MW polyoxypropylene glycol, and a few drops of DBU catalyst were heated together at 150° C. for about 16 hours. Infrared analysis of the viscous yellow liquid product showed the consumption of all the hydroxyl groups.

Thus there was produced an azetidine-2,4-dione prepolymer in accordance with the present invention having the formula

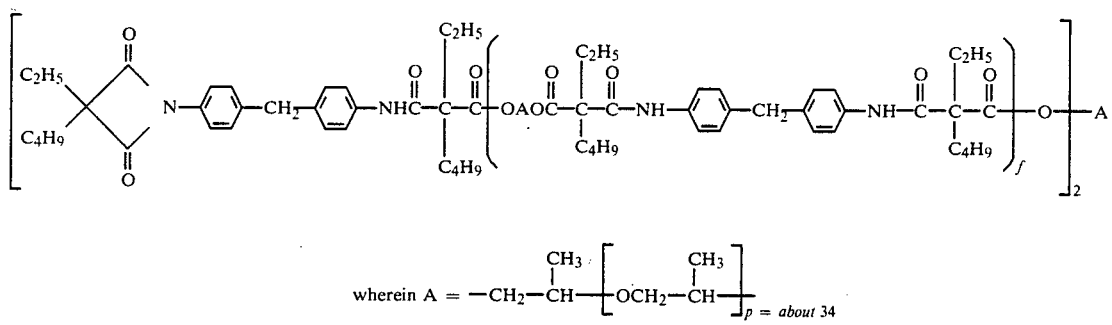

having a viscosity of 4800 cps at 25° C. Gel permeation chromatography indicated that f had a mean value approaching 0.

EXAMPLE 4

Using a similar apparatus and procedure as set forth in Example 1, 215.46 g. (0.43 mole) of 1,1'-methylenebis[4-(3-ethyl-3-butyl-2,4-dioxo-azetidino)-benzene], 438 g. (0.214 mole) of a polyhexamethylene adipate diol having a MW of about 2043 which had been vacuum dried to remove moisture and about 0.5 g. of DBU were heated at 150° C. for about 14 hours. Infrared analysis of the resulting viscous liquid showed the consumption of all the hydroxyl groups at 3500 cm$^{-1}$.

Thus there was produced an azetidine-2,4-dione prepolymer having the formula

A 300 ml. beaker fitted with a mechanical stirrer was charged with 42 g. (0.37 mole) of caprolactam and 0.6 g. of a 50 percent by weight dispersion of sodium hydride in oil. The beaker was heated in an oil bath at about 140° C. while the contents were stirred. Some bubbling (evolution of hydrogen) occurred and a clear solution formed after a few minutes. A 5 g. sample of the azetidine-2,4-dione prepolymer prepared in accordance with Example 1 was added to the beaker with vigorous stirring. After approximately 3 minutes the melt solution became viscous and cloudy. About 15 minutes later a solid polymer plug (Ia) was removed from the beaker.

Repetition of the above polymerization reaction using the same reactants but with the azetidine-2,4-dione prepolymer increased to about 10 g. and the temperature raised to 180° C. produced a solid polymer plug (Ib).

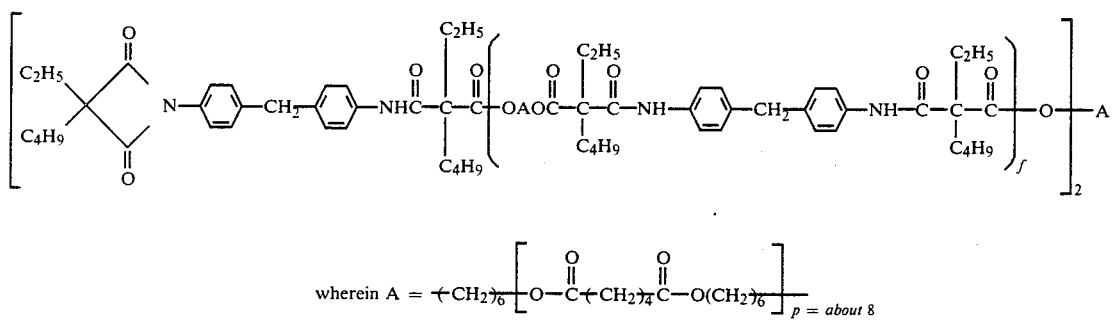

which was a solid at room temperature (about 20° C.). GPC data was not obtained for this sample but the mean value of f was assumed to be between 0 and 1.

EXAMPLE 5

The following experiments describe the preparation of three polyamide block copolymers (Ia through Ic) in accordance with the present invention wherein the same soft segment was employed throughout but at the weight percent levels of the total copolymer weight of about 10, 20, and 36 respectively.

The third polymerization employed a different catalyst and a slightly different procedure wherein the 42 g. of caprolactam and 23.6 g. of azetidine-2,4-dione prepolymer according to Example 1 were mixed at 100° C. followed by the addition of 5 ml. of a 1.1 molar solution of ethyl magnesium bromide in toluene. The temperature was raised and at about 120° C. the melt became very viscous and when the temperature reached 130° C. the melt solidified to a polymer plug (Ic).

The three copolymers had the following general formula and the respective properties set forth below.

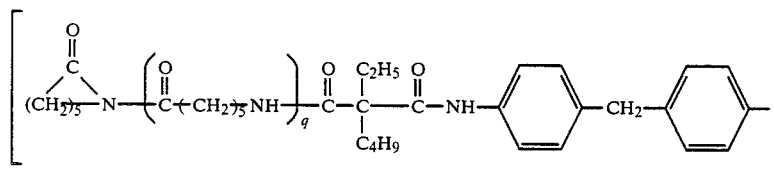

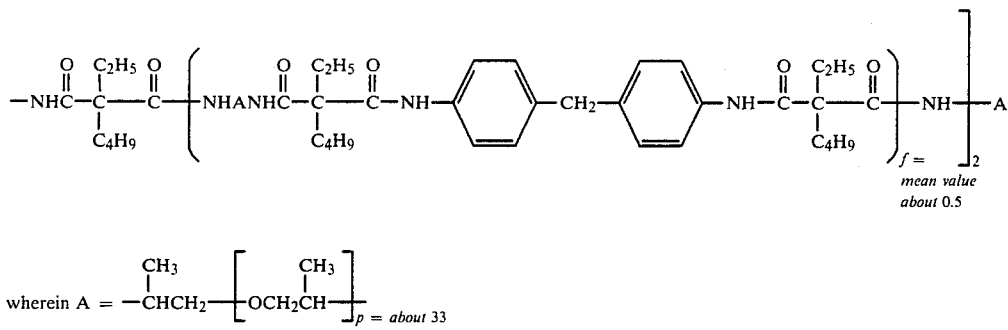

wherein $A = -CHCH_2-[-OCH_2CH-]_p \quad p = about\ 33$
              $\quad\quad\quad\; |CH_3 \quad\quad\quad |CH_3$ Ia: 10 percent by weight soft segment: q=mean value of 121; ηinh=1.04 dl/g*

Ib: 20 percent by weight soft segment: q=mean value of 53; 0ηinh=0.82 dl/g*

Ic: 36 percent by weight soft segment: q=mean value of 30; 0ηinh=0.56 dl/g*

*determined as 0.5 weight percent solution in 88 percent formic acid at 30° C.

A polymerization was attempted using the same proportions by weight as in polymer (Ib) but instead of using a prepolymer, the unreacted components of a prepolymer were employed. Accordingly, 11.3 g. (0.1 mole) of caprolactam, 0.25 g. of a 50 percent by weight dispersion in oil of sodium hydride, 2.09 g. (0.001 mole) of the Jeffamine D diamine described in Example 1, and 0.78 g. (0.002 mole) of 1,1'-methylenebis[4-(3,3-dimethyl-2,4-dioxo-azetidino) benzene] were reacted together in a polymer tube at 135° C. for 30 minutes.

A homogeneous polymer did not form but rather the lactam polymerized very rapidly and phase-separated with the unreacted Jeffamine forming a top layer. The difference in the reactivity of the prepolymer reactants and the prepolymer itself was clearly demonstrated. While the latter azetidinedione component differs from the one used in the prepolymer for polymer (Ib) by having the 3,3-dimethyl ring substitution instead of 3-ethyl-3butyl, the two compounds can be considered virtually identical for the purpose of this comparison.

EXAMPLE 6

The following experiments describe the preparation of three polyamide block copolymers (Id through If) in accordance with the present invention.

A 1 l. dried and argon purged resin kettle fitted with a stirrer, thermometer, and argon purge inlet tube was charged with 370 g. (3.27 mole) of caprolactam. The caprolactam was melted by placing the flask in an oil bath at 90° C. A 10 ml. portion of 3.1 molar ethyl magnesium bromide solution in diethyl ether (0.031 mole or 1 mole percent of the caprolactam) was added to the molten caprolactam through a dried nitrogen purged syringe. White vapors formed above the caprolactam which were purged from the kettle.

A 92.5 g. sample of the azetidine-2,4-dione prepolymer prepared in accordance with Example 2 was poured into the molten caprolactam with vigorous stirring. The temperature of the oil bath was raised and at 120° C. the molten solution became viscous and around 130° C. it solidified to a solid white polymer plug. It was left in the 130° C. oil bath for an additional 30 minute period and was then recovered as a polymer plug (Id).

In a similarly run polymerization but on a smaller scale and carried out in a side-arm polymerization tube, 12.0 g. of molten caprolactam was mixed with about 1 ml. of the 3.1 molar ethyl magnesium bromide solution described above, followed by 4 g. of the prepolymer of Example 2. Upon raising the temperature from the initial 90° C., the melt became very viscous and at 130° C. the melt became a solid white polymer plug (Ie).

In a third polymerization run similarly to the previous one using the polymerization tube, the 12 g. of molten caprolactam and 1 ml. of the ethyl magnesium bromide solution were reacted with 5.9 g. of the prepolymer of Example 2. In exactly the same manner as above, the molten mixture polymerized to an off-white polymer plug (If).

The three copolymers had the following general formula and the respective properties set forth below.

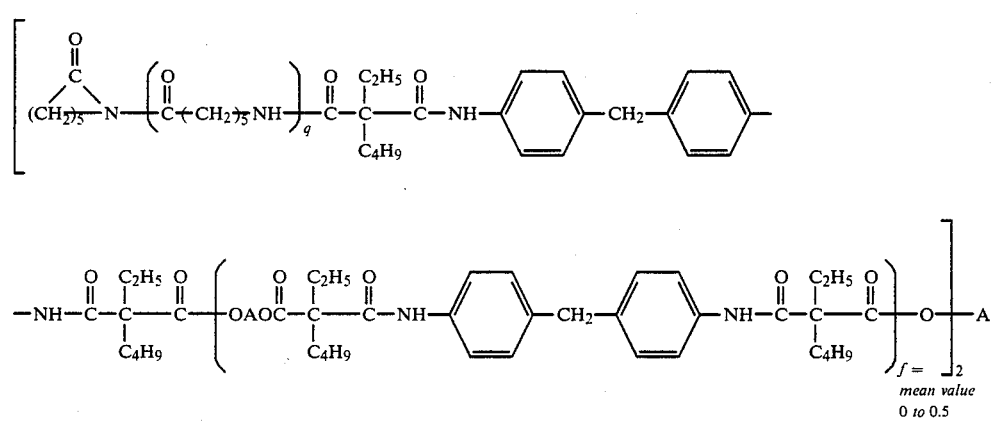

wherein A = 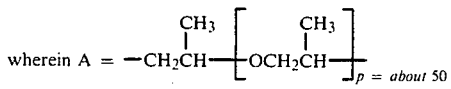

Id: 20 percent by weight soft segment: q=mean value of 71; ηinh=1.31 dl/g*

Ie: 25 percent by weight soft segment: q=mean value of 55; ηinh=1.25 dl/g*

If: 33 percent by weight soft segment: q=mean value of 37; ηinh=0.92 dl/g*

*determined as 0.5 weight percent solution in 88 percent formic acid at 30° C.

A preparation of the (Id) copolymer was repeated exactly but on a larger scale and the solid product was cut into discs, chopped into granules and dried in a dryer hopper at 95° C. prior to injection molding.

The polymer was injection molded into test bars using an Arburg Model 221E. The molding conditions were as follows: pressure=1200 psi; zone 1=200° C.; zone 2=°C.; zone 3=210° C.; mold=50° C.

The molded pieces were characterized by the following physical properties:

| | |
|---|---|
| Tensile str. (psi) | 5570 |
| Tensile modulus (psi) | 187,000 |
| Elongation, % at break | 130 |
| Flex. str. (psi) | 10,570 |
| Flex. modulus (psi) | 240,200 |
| Izod impact (ft. lbs/in.) (ASTM Test D256-56) notched ⅛" | 7.67 |
| Heat deflection temp. at 66 psi (ASTM Test D648-56) | 75° C. |
| Hardness (Shore D) | 72 |

EXAMPLE 7

A dry round-bottom flask containing a magnetic stirring bar was charged with 218 g. (1.93 mole) of freshly distilled caprolactam. During stirring and under a nitrogen atmosphere, there was added 15 ml. of a 3.1 molar solution of ethyl magnesium bromide in diethyl ether. A 60 g. portion of the azetidine-2,4-dione prepolymer prepared in accordance with Example 3 was degassed by being heated to about 130° C. under a vacuum of about 20 mm of mercury. It was then placed in a 1000 ml. plastic tri-pour cup along with the catalyzed caprolactam. The solution was stirred with a high speed stirrer and placed in a vacuum oven at 90° C. and 20 mm of mercury for an additional 2 minutes for further degassing. Thereafter the solution was poured into a 6"×6"×⅛" stainless steel heated mold (top temp.=155° C., bottom=150° C.). The plaque was demolded in 10 minutes.

Thus there was prepared a copolymer (Ig) in accordance with the present invention having the following formula

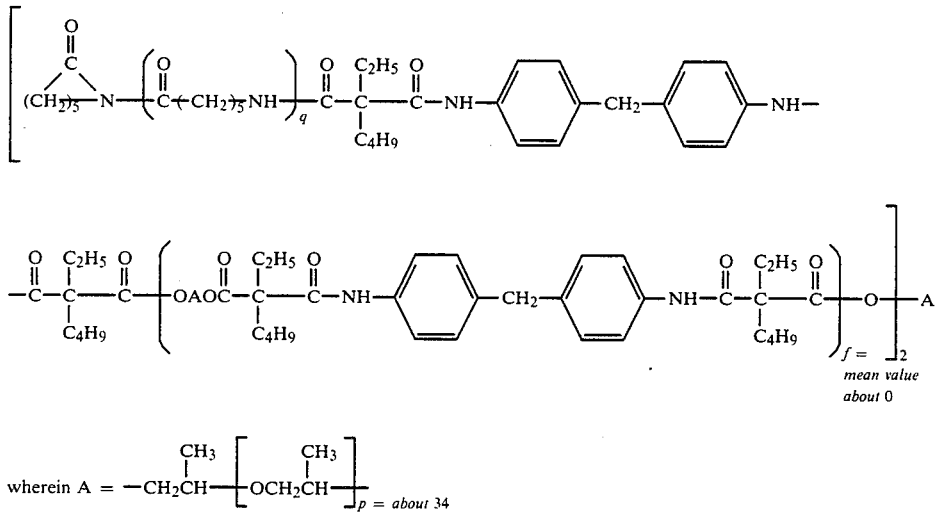

wherein the soft segment=21.5 percent by weight; q=mean value of 53; ηinh=0.94 dl/g*

*determined as 0.5 weight percent solution in 88 percent formic acid at 30° C.

The molded plaque was characterized by the following physical properties:

| | |
|---|---|
| Tensile str. (psi) | 4175 |
| Tensile modulus (psi) | 110,700 |
| Elongation (%) | 28.2 |
| Flex. str. (psi) | 7730 |
| Flex. modulus | 181,460 |
| Izod impact (ft. lbs/in.) ⅛" notch | 0.80 |
| Heat deflection temp. at 66 psi | 189° C. |
| Density g/cc | 1.062 |
| Hardness (Shore D) | 72 |

EXAMPLE 8

The following experiments describe the preparation of two polyamide block copolymers (Ih) and (Ii) in accordance with the present invention.

A 2 l. resin flask fitted with a stirrer, thermometer, and argon purge inlet tube was charged with 900 g. (7.96 mole) of caprolactam and melted at 90° C. A 25 ml. portion of a 3.1 molar solution of ethyl magnesium bromide in diethyl ether was added to the molten lactam using a nitrogen purged syringe. After some while vapors were purged from the kettle, 225 g. of the azetidine-2,4-dione prepolymer prepared in accordance with Example 4 was poured into the molten caprolactam with vigorous stirring.

The temperature was raised and at about 120° C. the molten solution became viscous and at about 130° C. it solidified to a solid white plug. The plug was allowed to stay at the oil bath temperature of 130° C. for an additional 30 minute period and was then recovered as a polymer plug (Ih).

In a similarly run polymerization but on a smaller scale, 200 g. (1.77 mole) of caprolactam, catalyzed by a 5 ml. portion of the ethyl magnesium bromide solution described above, and 200 g. of the azetidine-2,4-dione prepolymer in accordance with Example 4 were polymerized to a polymer plug (Ii).

The two copolymers had the following general formula and the respective properties set forth below.

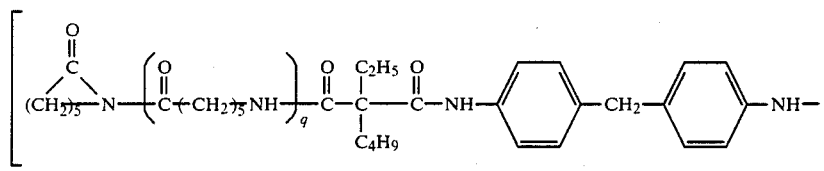

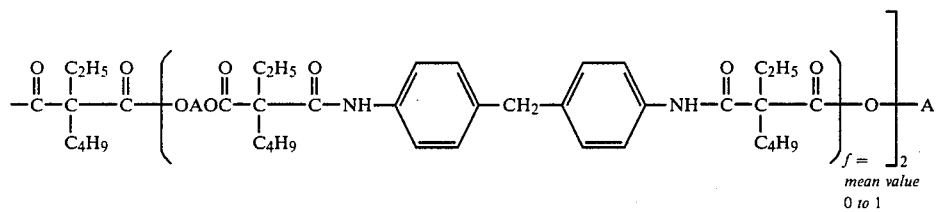

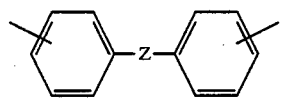

Ih: 20 percent by weight soft segment; q=mean value of 53; $\eta inh=0.89$ dl/g*

Ii: 50 percent by weight soft segment; q=mean value of 12; $\eta inh=0.18$ dl/g*

*determined as 0.5 weight percent solution in 88 percent formic acid at 30° C.

Copolymer (Ii) was a much softer more elastomeric polymer than (Ih).

We claim:

1. An azetidine-2,4-dione prepolymer having the formula

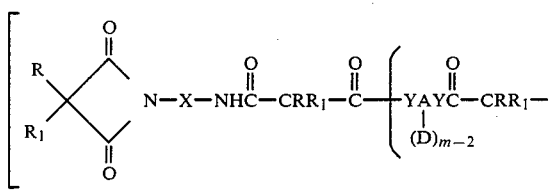

-continued $$-\overset{O}{\underset{\|}{C}}NHXNH\overset{O}{\underset{\|}{C}}-CRR_1-\overset{O}{\underset{\|}{C}}\Big)_f-Y-A\Big]_m$$

wherein A is the residue of a polymeric polyol or polyamine having a molecular weight of from about 400 to about 8000 and a functionality m of from about 2 to about 6, Y represents —O— when said A is the residue of a polymeric polyol and —NH— when said A is the residue of a polymeric polyamine, f has an average value between 0 and 1, D represents a branch unit when the functionality of said polymeric polyol or polyamine is greater than 2, R and $R_1$ when taken separately are independently selected from the group consisting of hydrogen and hydrocarbyl, and when R and $R_1$ are taken together with the carbon atom to which they are joined represent a cycloalkane having 4 to 8 ring carbon atoms, inclusive, and X is selected from the group consisting of lower alkylene, cycloalkylene, arylene, and divalent radicals having the formula wherein Z is selected from the group consisting of —CO—, —O—, —SO$_2$—, and alkylene having 1 to 4 carbon atoms, inclusive.

2. A prepolymer according to claim 1 wherein m equals 2 and A is the residue of a polymeric diol or polymeric diamine.

3. A prepolymer according to claim 1 wherein R and $R_1$ are the same or different alkyl having 1 to 4 carbon atoms and X is arylene.

4. A prepolymer according to claim 1 wherein R and $R_1$ are the same or different alkyl having 1 to 4 carbon atoms and X is a divalent radical having the formula

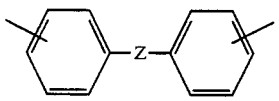

wherein Z is selected from the group consisting of —CO—, —O—, —SO$_2$—, and alkylene having 1 to 4 carbon atoms.

5. A prepolymer according to claim 1 having the formula:

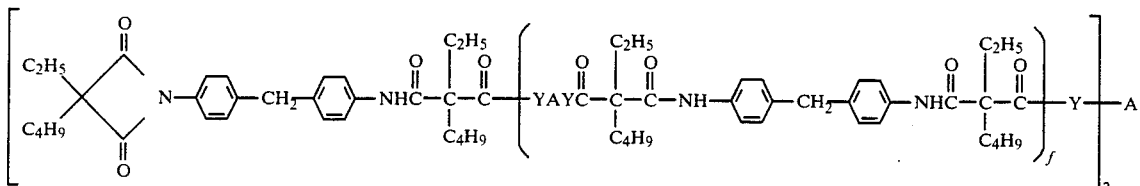

wherein said A is the residue of a polymeric diol or diamine having a molecular weight of from about 600 to about 4000 and Y and f have the significance defined in claim 1.

6. A prepolymer according to claim 5 wherein Y is —O— and A is the residue of a polyoxypropylene diol having a molecular weight of about 2000.

7. A prepolymer according to claim 5 wherein Y is —O— and A is the residue of a polyoxypropylene diol having a molecular weight of about 3000.

8. A prepolymer according to claim 5 wherein Y is —O— and A is the residue of a poly(hexamethylene adipate) diol having a molecular weight of about 2000.

9. A prepolymer according to claim 5 wherein Y is —NH— and A is the residue of a polyoxypropylene diamine having a molecular weight of about 2000.

10. A process for the preparation of an azetidine-2,4-dione prepolymer according to claim 1 said process comprising reacting, (A). an azetidine-2,4-dione having the formula

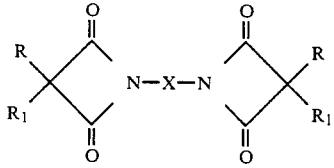

wherein R and R$_1$ when taken separately are independently selected from the group consisting of hydrogen and hydrocarbyl and when R and R$_1$ are taken together with the carbon atom to which they are joined represent a cycloalkane having 4 to 8 ring carbon atoms, inclusive, and X is selected from the group consisting of lower alkylene, cycloalkylene, arylene, and divalent radicals having the formula

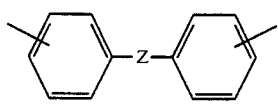

wherein Z is selected from the group consisting of —CO—, —O—, —SO$_2$—, and alkylene having 1 to 4 carbon atoms, inclusive, and (B) a polyol or polyamine having the formula

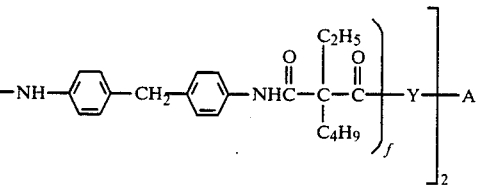

[H—Y]$_m$A wherein A is the residue of a polymeric polyol or polyamine having a molecular weight of from about 400 to about 8000 and a functionality m of from about 2 to about 6, Y represents —O— when said A is the residue of a polymeric polyol and —NH— when A is the residue of a polymeric polyamine and wherein the number of moles of (A) employed per mole of (B) is substantially equal to the value of m in said (B).

11. A process according to claim 10 wherein in said (A), R and R$_1$ are the same or different alkyl having 1 to 4 carbon atoms and X is arylene.

12. A process according to claim 10 wherein in said (A) R and R$_1$ are the same or different alkyl having 1 to 4 carbon atoms and X is a divalent radical having the formula

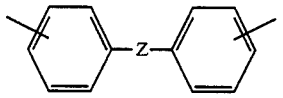

wherein Z is selected from the group consisting of —CO—, —O—, —SO$_2$—, and alkylene having 1 to 4 carbon atoms.

13. A process according to claim 10 wherein said (B) is a polyoxypropylene diol having a molecular weight of about 2000.

14. A process according to claim 10 wherein said (B) is a polyoxypropylene diol having a molecular weight of about 3000.

15. A process according to claim 10 wherein said (B) is a poly(hexamethylene adipate) diol having a molecular weight of about 2000.

16. A process according to claim 10 wherein said (B) is a polyoxypropylene diamine having a molecular weight of about 2000.

* * * * *